United States Patent [19]
Suh et al.

[11] 3,883,560
[45] May 13, 1975

[54] SALICYLAMIDOPHENETHANOLAMINES

[75] Inventors: John T. Suh, Mequon; Thomas M. Bare, Milwaukee, both of Wis.

[73] Assignee: Colgate-Palmolive Company, New York, N.Y.

[22] Filed: July 5, 1973

[21] Appl. No.: 376,707

[52] U.S. Cl............................... 260/340.5; 424/232
[51] Int. Cl............................................ C07d 13/10
[58] Field of Search................... 260/340.5; 424/232

[56] References Cited
UNITED STATES PATENTS

| | | | |
|---|---|---|---|
| 3,211,792 | 10/1965 | Osbond et al.................... | 260/340.5 |
| 3,700,692 | 10/1972 | Suh et al.......................... | 260/340.5 |
| 3,705,233 | 12/1972 | Lunts et al........................ | 424/45 |

*Primary Examiner*—V. D. Turner
*Attorney, Agent, or Firm*—T. F. Kryshak; M. L. Youngs

[57] ABSTRACT

The compounds are salicylaminophenethanolamines which are useful as central nervous system depressants, antihypertensive agents, anti-arrhythmic agents, anti-anginal agents, analgetic agents and agents to control aggressive antisocial behavior in animals. Among the compounds disclosed is methyl 5-{1-hydroxy-2-[[1-methyl-3-(3,4-methylenedioxyphenyl)propyl]amino]ethyl}salicylamide.

5 Claims, No Drawings

SALICYLAMIDOPHENETHANOLAMINES

BACKGROUND OF THE INVENTION

Compounds which are structurally related to the compounds of the present invention are disclosed by Farmer, et al. in the British Journal of Pharmacology, 45, 660 (1972), and in U.S. Pat. Nos. 3,644,353, 3,705,233 and 3,700,692.

DETAILED DESCRIPTION

The compounds of the present invention may be represented by the following formula

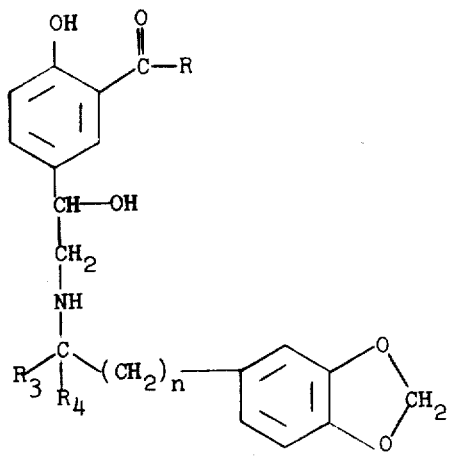

in which $n$ is 1 to 3, R is hydroxy,

and $OR_1$, in which $R_1$ and $R_2$ are selected from hydrogen and lower alkyl of one to four carbon atoms such as methyl, ethyl, isopropyl and butyl, and $R_3$ and $R_4$ are hydrogen or a lower alkyl of one to four carbon atoms.

The following is a brief description of the preferred method of preparing the compounds as employed to prepare the compound 5-{1-hydroxy-2[[1-methyl-2-(3,4-methylenedioxyphenyl)ethyl]amino]ethyl-} salicylamide. The compound methyl 5-acetylsalicylate is dissolved in chloroform and bromine is added. When the reaction is complete, the mixture is concentrated to yield methyl 5-bromoacetylsalicylate. The thus obtained compound is dissolved in tetrahydrofuran and reacted with α-methyl-3,4-methylenedioxyphenethylamine to form methyl 5-[N-[1-methyl-2-(3,4-methylenedioxphenyl)ethyl]glycyl]salicylate hydrochloride. The aminoketone hydrochloride is then hydrogenated in the presence of a suitable catalyst such as 10% palladium on carbon to form methyl 5-{1-hydroxy-2-[[1-methyl-2-(3,4-methylenedioxyphenyl)ethyl]amino]ethyl}salicylate hydrochloride. The thus obtained aminoalcohol is then treated with sodium hydroxide to form methyl 5-{1-hydroxy-2-[[1-methyl-2-(3,4-}methylenedioxyphenyl)ethyl]amino]ethyl}salicylate. The methyl ester can then be treated if desired with methanolic ammonia to give 5-{1-hydroxy-2-[[1-methyl-2-(3,4-methylenedioxyphenyl)ethyl]amino]ethyl-} salicylamide. The preferred practice of the invention is further described in greater detail in the examples.

The preferred process may be illustrated as follows:

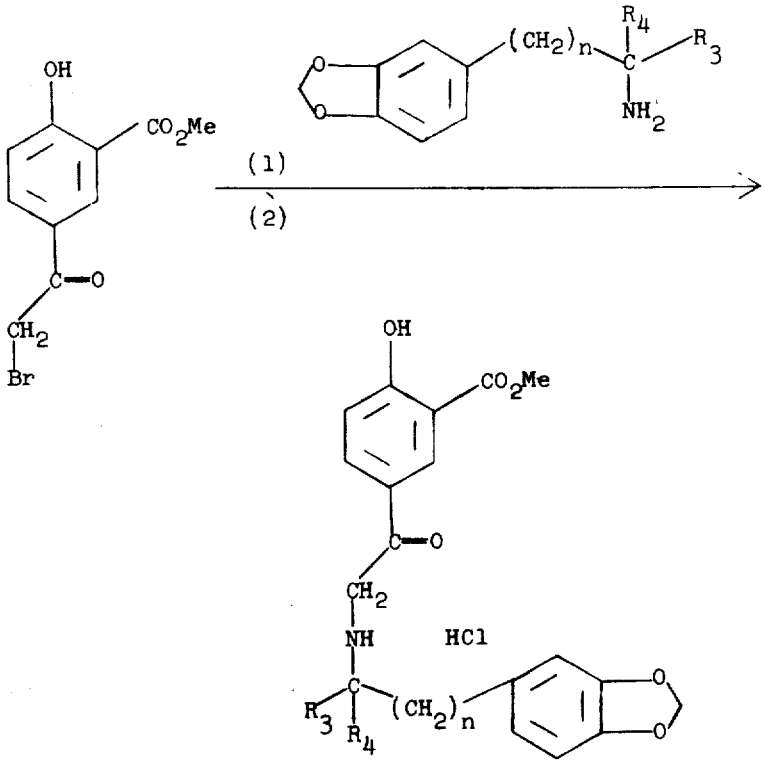

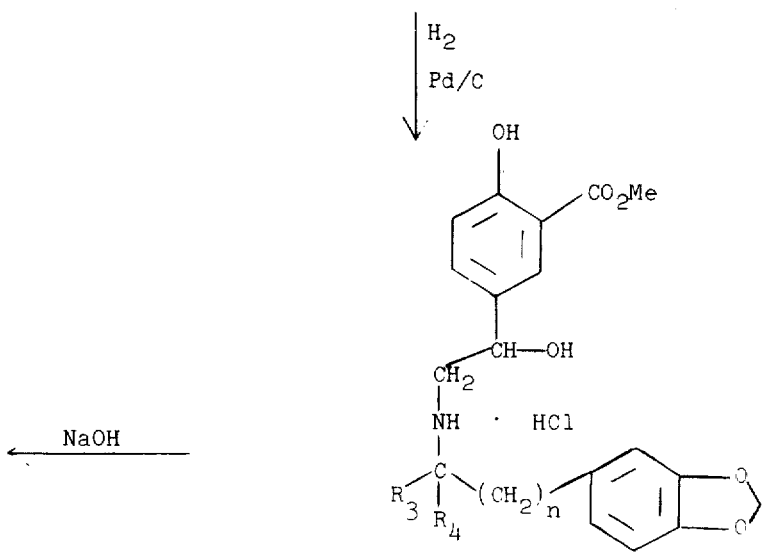

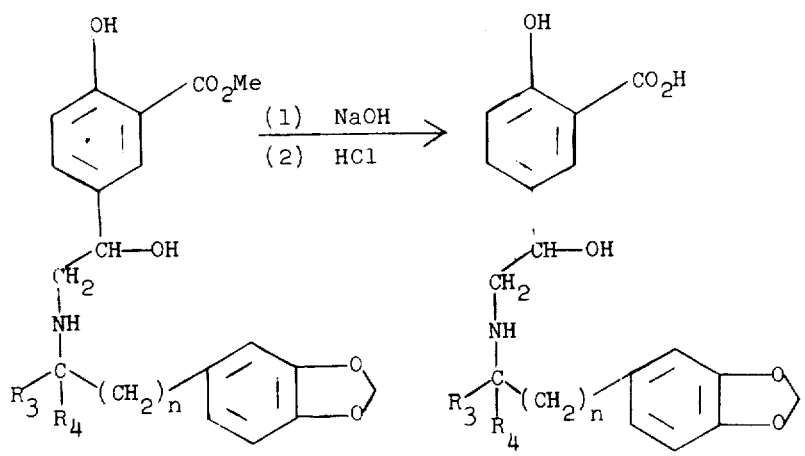

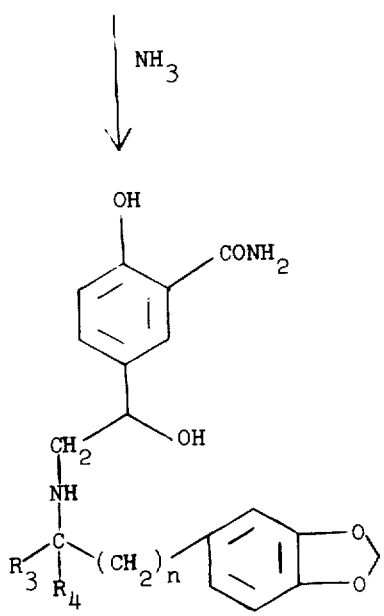

in which $R_3$, $R_4$ and $n$ are as previously described.

Representative of the compounds which may be prepared by the described process are the following:

5-{1-Hydroxy-2-[[1-methyl-2-(3,4-methylenedioxyphenyl)ethyl]amino]ethyl-} salicylamide, Methyl 5-{1-hydroxy-2-[[1-methyl-3-(3,4-methylenedioxyphenyl)propyl]amino]ethyl}salicylate hydrochloride, 5-{1-Hydroxy-2-[[1-methyl-3-(3,4-methylenedioxyphenyl)propyl]amino]ethyl-} salicylamide, Methyl 5-{1-hydroxy-2-[[1-methyl-2-(3,4-methylenedioxyphenyl)ethyl]amino]ethyl}salicylate hydrochloride, 5-{1-Hydroxy-2-[[1-methyl-2-(3,4-methylenedioxyphenyl)ethyl]amino]ethyl}salicylic acid, Methyl 5-{1-hydroxy-3-[[1,1-dimethyl-3-(3,4-methylenedioxyphenyl)propyl]amino]ethyl}salicylate hydrochloride, and 5-{1-Hydroxy-2-[[1-methyl-3-(3,4-methylenedioxyphenyl)propyl]amino]ethyl}salicylic acid.

The novel compounds of the present invention are useful as pharmaceutical agents because of their central nervous system depressant, analgetic, antihypertensive, anti-arrhythmic, anti-anginal and antipsychotic properties, especially their ability to control antisocial aggressive behavior when administered to animals. For example, the compounds 5-{1-hydroxy-2-[[1-methyl-3-(3,4-methylenedioxyphenyl)propyl]-amino]ethyl}salicylamide and methyl 5-{1-hydroxy-2-[[1-methyl-3-(3,4-methylenedioxyphenyl)propyl]amino]ethyl}-salicylate hydrochloride are effective in decreasing the aggressiveness, viciousness and persistance of fighting among isolated mice receiving 10 mg/kg intraperitoneally. Agents which have the ability to control antisocial behavior are useful as tranquilizing agents in both medicinal and veterinary practice.

The compound methyl 5-{1-hydroxy-2-[[1-methyl-3-(3,4-methylenedioxyphenyl)propyl]amino]ethyl}salicylate hydrochloride was found to be effective in lowering blood pressure when administered in 1.0 mg/kg and 3.0 mg/kg intravenous doses to a vagotomized, anesthetized dog which is a standard animal preparation for testing antihypertensive activity. In addition, the compound in 0.3 mg/kg and 1.0 mg/kg doses produced an increase in the contractile force of the heart. The compound also exhibited $\beta$-adrenergic blocking activity which suggests anti-anginal and anti-arrhythmic utility.

The compound 5-{1-hydroxy-2-[[1-methyl-3-(3,4-methylenedioxyphenyl)propyl]amino]ethyl}salicylamide, when evaluated by the procedure described by Eddy, et al. in the *Journal of Pharmacol. Exptl. Therap.*, 107, 385 (1953), was found at a dose of 100 mg/kg to possess analgetic activity.

In animal behavioral tests, the above-mentioned compounds exhibited a central nervous system depressant activity. In mice receiving the compounds intraperitoneally in the form of a 5% acacia suspension, decreased alertness, reactivity, struggle response and other behavioral characteristics of central nervous system depression were observed. As a result of the behavioral studies, the compounds also were found to have $LD_{50}$ values in excess of 100 mg/kg. The behavioral studies were conducted in accordance with the procedure set forth by Irwin in *Animal and Clinical Pharmacologic Techniques in Drug Evaluation*, J. H. Nodine and P. E. Siegler, Ed., Year Book Publishers, Inc., 1964, pp. 36–54.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt forming compounds with a suitable alkylating agent such as dimethyl sulfate, or an alkyl halide such as methyl chloride, methyl iodide or ethyl bromide.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compounds are not soluble in water, a pharmaceutically acceptable organic solvent such as propylene glycol may be employed.

Solid pharmaceutical diluents such as atarch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily. In actual practice, the amount of drug required to produce the desired antipsychotic effect will, of course, vary considerably because of patient differences.

The following examples are presented to illustrate this invention:

EXAMPLE 1

Methyl 5-bromoacetylsalicylate

To a stirred solution of methyl 5-acetylsalicylate 1 (19.42 g., 100 mmoles) in 64 ml. of chloroform is added dropwise a solution of 15.98 g. (100 mmoles) of bromine in 190 ml. of chloroform. After the addition is complete, the reaction mixture is concentrated to leave a pale orange solid. The solid is dissolved in a minimum amount of hot ethyl acetate and diluted with n-heptane. On standing at 0° for 1 hour, white crystals form which are collected and dried to give 22.06 g. of the bromoketone methyl 5-bromoacetylsalicylate as white crystals, m.p. 88.5°–90°.

EXAMPLE 2

Methyl 5-[N-[1-methyl-2-(3,4-methylenedioxyphenyl)ethyl]glycyl]salicylate hydrochloride A solution of 19.27 g. (70.5 mmoles) of the bromoketone of Example 1 in 106 ml. of tetrahydrofuran (THF) is added dropwise to a stirred solution of $\alpha$-methyl-3,4-methylenedioxyphenethylamine (26.50 g., 148.1 mmoles) in 51 ml. of THF. An exothermic reaction occurs and the temperature is maintained at 25°–30° by periodic immersion in an ice bath. After the addition is complete, the reaction mixture is seeded with a few crystals of $\alpha$-methyl-3,4-methylenedioxyphenethylamine hydrobromide and stirred at room temperature for 1 hour. The mixture is filtered and the collected solid washed with ether and air-dried to give 17.76 g. of $\alpha$-methyl-3,4-methylenedioxyphenethylamine hydrobromide. The combined filtrate and washes are concentrated and the orange gummy residue is dissolved in 100 ml. of methanol and acidified with ethereal hydrogen chloride, whereupon a pale yellow precipitate forms. The mixture is cooled, diluted with ether and filtered to separate 20.13 g. of a pale yellow solid, m.p. 211°. A portion of the solid is recrystallized from ethanol to give the methyl 5-[N-[1-methyl-2-(3,4-methylenedioxyphenyl)ethyl]glycyl]salicylate hydrochloride as a white solid, m.p. 214°.

Anal. Calcd. for $C_{20}H_{22}ClNO_2$: C, 58.89; H, 5.44; N, 3.43.

Found: C, 59.04; H, 5.44; N, 3.41.

EXAMPLE 3

Methyl 5-{1-hydroxy-2-[[1-methyl-2-(3,4-methylenedioxyphenyl)ethyl]amino]ethyl}salicylate hydrochloride A mixture of 6.00 g. (14.7 mmoles) of the aminoketone hydrochloride of Example 2 and 0.60 g. of 10% palladium on carbon in 65 ml. of methanol is hydrogenated on the Parr apparatus for 19 hours. A solid is present in the hydrogenation mixture. This material is dissolved on warming and the mixture is filtered warm to separate the catalyst. The filtrate is concentrated to leave a white solid which is recrystallized from methanol (75 ml.) to give 4.37 g. of methyl 5-{1-hydroxy-2-[[1-methyl-2-(3,4-methylenedioxyphenyl)ethyl]amino]ethyl}salicylate hydrochloride as white crystals, m.p. 202°.

Anal. Calcd. for $C_{20}H_{24}NO_6Cl$: C, 58.60; H, 5.90; N, 3.42.

Found: C, 58.93; H, 5.76; N, 3.36.

EXAMPLE 4

Methyl 5-{1-hydroxy-2-[[1-methyl-2-(3,4-methylenedioxyphenyl)ethyl]amino]ethyl}salicylate To a mixture of 0.171 g. (4.28 mmoles) of sodium hydroxide, 20 ml. of water and 20 ml. ether in a separatory funnel is added 1.75 g. (4.27 mmoles) of the aminoalcohol hydrochloride of Example 3. The mixture is shaken thoroughly and the ether layer separated. The aqueous layer is extracted with 2 × 20 ml. portions of ether and the combined organic material washed with water, dried over $MgSO_4$, filtered, and concentrated to leave a gum which slowly crystallizes to a white solid. Recrystallization from benzene-n-heptane gives 1.21 g. of methyl 5-{1-hydroxy-2-[[1-methyl-2-(3,4-methylenedioxyphenyl)ethyl]amino]ethyl}salicylate as white crystals, m.p. 99°–109°.

EXAMPLE 5

5-{1-Hydroxy-2-[[1-methyl-2-(3,4-methylenedioxyphenyl)ethyl]amino]ethyl}salicylamide A solution of 5.00 g. (13.4 mmoles) of the methyl ester of Example 4 in 13 ml. of methanol is diluted with 27 ml. of a saturated (at 0°) methanol solution of ammonia. After standing for 72 hours, the solution is concentrated to leave a white solid which is triturated with ethyl acetate and filtered. The collected gummy solid is triturated with water, filtered, and the collected solid air-dried to give 4.16 g. of 5-{1-hydroxy-2-[[1-methyl-2-(3,4-methylenedioxyphenyl)ethyl]amino]ethyl-}salicylamide as a white solid, m.p. 182°.

Anal. Calcd. for $C_{19}H_{22}N_2O_5$: C, 63.67; H, 6.19; N, 7.82.

Found: C, 63.52; H, 6.27; N, 7.75.

EXAMPLE 6

Methyl 5-[N-[1-methyl-3-(3,4-methylenedioxyphenyl)propyl]glycyl]salicylate hydrochloride A solution of 21.3 g. (78.2 mmoles) of bromoketone of Example 1 in 115 ml. of THF is added to a stirred solution of 15.12 g. (78.2 mmoles) of 1-methyl-3-(3,4-methylenedioxyphenyl)propylamine in 55 ml. of THF containing 8.88 g. (88.0 mmoles) of triethylamine. The temperature is maintained at 20°–25° during the addition; near the end of the addition (20 min.), a white precipitate forms. The mixture is stirred an additional 2 hours at 25° and then filtered to separate 12.28 g. of triethylamine hydrobromide. The filtrate is concentrated and the residual orange oil dissolved in 50 ml. of methanol and acidified with ethereal HCl. A precipitate forms and the mixture is diluted carefully with 25 ml. of ether. After standing at 0° for 1 hour, the mixture is filtered and the collected solid washed with several portions of cold ethanol and then ether. After air-drying, 17.90 g. is obtained of methyl 5-[N-[1-methyl-3-(3,4-methylenedioxyphenyl)propyl]glycyl]salicylate hydrochloride, m.p. 196°.

EXAMPLE 7

Methyl 5-{1-hydroxy-2-[[1-methyl-3-(3,4-methylenedioxyphenyl)propyl]amino]ethyl}salicylate hydrochloride A mixture of 16.27 g. (38.5 mmoles) of the aminoketone hydrochloride of Example 6, 1.8 g. of 10% palladium on carbon, and 160 ml. of methanol is hydrogenated on the Parr apparatus for 11.5 hours. The resulting mixture is diluted with 340 ml. of methanol, warmed to dissolve the organic solid, and filtered hot. The filtrate is concentrated to a total volume of 75 ml. and cooled, whereupon white needles form. These are collected and air-dried to give 7.83 g. of methyl 5-{1-hydroxy-2-[[1-methyl-3-(3,4-methylenedioxyphenyl)propyl]amino]ethyl}salicylate hydrochloride as a white solid, m.p. 197°.

Anal. Calcd. for $C_{21}H_{26}ClNO_6$: C, 59.50; H, 6.18; N, 3.30.

Found: C, 59.62; H, 6.17; N, 3.23.

EXAMPLE 8

Methyl 5-{1-hydroxy-2-[[1-methyl-3-(3,4-methylenedioxyphenyl)propyl]amino]ethyl}salicylate To a solution of 0.0945 g. (2.36 mmoles) of sodium hydroxide in 10 ml. of water is added 10 ml. of ether and 1.00 g. (2.36 mmoles) of the amino-alcohol hydrochloride of Example 7. The mixture is shaken thoroughly and the ether separated. The aqueous layer is extracted with ether and the combined organic material is washed with water, dried ($MgSO_4$), filtered, and concentrated to leave 0.86 g. of methyl 5-{1-hydroxy-2-[[1-methyl-3-(3,4-methylenedioxyphenyl)propyl]amino]ethyl} salicylate as a pale yellow gum.

EXAMPLE 9

5-{1-Hydroxy-2-[[1-methyl-3-(3,4-methylenedioxyphenyl)propyl]amino]ethyl}salicylamide To a solution of 0.86 g. (2.2 mmoles) of the above crude aminoalcohol of Example 8 in 3 ml. of methanol is added 15 ml. of a solution of methanol (containing a catalytic amount of sodium methoxide) saturated with anhydrous ammonia at 0°. After standing in a stoppered flask for 48 hours, the solution is concentrated to leave a pale yellow gum which is dissolved in a small amount of ethanol. On diluting the ethanol solution with water, an oil precipitates and this slowly crystallizes to give a pale yellow solid. The solid is collected and air-dried to give 0.59 g. of 5-{1-hydroxy-2-[[1-methyl-3-(3,4-methylenedioxyphenyl)propyl]amino]e- thyl}salicylamide, m.p. 150°–152°.

Anal. Calcd. for $C_{20}H_{24}N_2O_5$: C, 64.50; H, 6.50; N, 7.52.

Found: C, 64.54; H, 6.54; N, 7.49.

We claim:
1. A compound of the formula

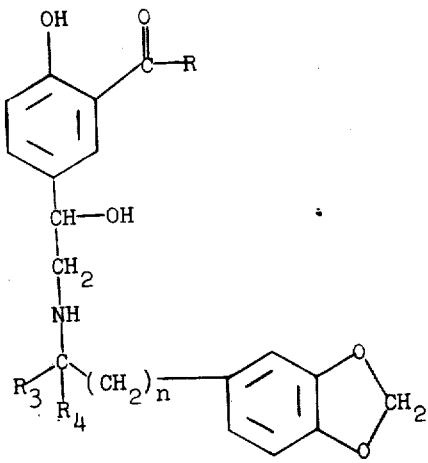

in which $n$ is 1 to 3, R is $NH_2$ and $R_3$ and $R_4$ are hydrogen or a lower alkyl of one to four carbon atoms, and pharmaceutically acceptable acid addition salts thereof.

2. A compound of claim 1 in which $n$ is 1.

3. A compound of claim 1 in which $n$ is 2.

4. The compound of claim 1 which is 5-{1-hydroxy-2[(1-methyl-2-<3,4-methylenedioxyphenyl>ethyl)amino]-ethyl}-salicylamide.

5. The compound of claim 1 which is 5-{1-hydroxy-2-[(1-methyl-3-<3,4-methylenedioxyphenyl>propyl)amino]-ethyl}-salicylamide.

* * * * *